(12) United States Patent
Pei et al.

(10) Patent No.: US 10,997,624 B2
(45) Date of Patent: May 4, 2021

(54) OPTIMIZATION OF NETWORK-TRANSFERRED MULTI-CARD CONTENT ITEMS

(71) Applicant: Microsoft Technology Licensing, LLC, Redmond, WA (US)

(72) Inventors: Lihong Pei, San Jose, CA (US); Yaolin Wang, Santa Clara, CA (US); Jie Xiao, Sunnyvale, CA (US); Shu Zhang, Santa Clara, CA (US); Rohan Rajiv, Santa Clara, CA (US); Nihar Niranjan Mehta, Sunnyvale, CA (US); Rohan Koundal, Sunnyvale, CA (US); Abhinav Singh, Sunnyvale, CA (US); Roberto Alexis Rodriguez, San Francisco, CA (US); Kean Loong Tan, Milpitas, CA (US); Yanbo Ma, San Jose, CA (US); Yuhao Zhang, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 209 days.

(21) Appl. No.: 16/024,756

(22) Filed: Jun. 30, 2018

(65) Prior Publication Data

US 2020/0005355 A1     Jan. 2, 2020

(51) Int. Cl.
*G06Q 30/02*     (2012.01)
*G06F 16/958*    (2019.01)

(52) U.S. Cl.
CPC ....... *G06Q 30/0244* (2013.01); *G06F 16/958* (2019.01); *G06Q 30/0246* (2013.01)

(58) Field of Classification Search
None
See application file for complete search history.

(56) References Cited

U.S. PATENT DOCUMENTS

| | | | |
|---|---|---|---|
| 8,930,835 B1 * | 1/2015 | Kan ...................... | G06F 40/106 715/764 |
| 2007/0022442 A1 * | 1/2007 | Gil .................... | H04M 1/72561 725/62 |
| 2018/0115622 A1 * | 4/2018 | Zheng ..................... | H04L 51/32 |

* cited by examiner

*Primary Examiner* — Chrystina E Zelaskiewicz
(74) *Attorney, Agent, or Firm* — Hickman Becker Bingham Ledesma LLP; Daniel D. Ledesma

(57) ABSTRACT

Techniques for optimizing network-transferred multi-card content items are provided. In one technique, a first content item selection event is initiated that involves a set of content delivery campaigns that includes a content delivery campaign that includes a content item that comprises multiple cards. The content delivery campaign is selected and the content item is transmitted to a first computing device, where the multiple cards have a first card configuration. One or more events that are associated with the first computing device displaying at least one card of the plurality of cards is identified. Based on the events, a second card configuration is determined. Another content item selection event that involves the content delivery campaign is initiated and the content delivery campaign is selected. The content item is transmitted to a second computing device, where the multiple cards have the second card configuration.

20 Claims, 9 Drawing Sheets

230

CAMPAIGN MANAGER — Fix Dex ▾ Marketing CXO Account

STEP 4 of 6: SELECT CONTENT
Sponsor your content

Sponsored Content: Carousel
FixDex Customer Webinar Q1 2017

| All content ▾ | | Create Carousel ad | Sponsor selected Carousel |

Select  Ads                                                                 Created    Action ☐  ⊘ Carousel name: DSC Carousel content name example
    This is the ad commentary. http://www.example.com
    Card Description Lorem Ipsum Bacon    1 of 10          55m
    http://www.cardurl.com
    Show best performing cards first ⓘ  On ⦿

☐  ⊘ Carousel name: DSC Carousel content name example
    This is the ad commentary. http://www.example.com
    Card Description Lorem Ipsum Bacon    2 of 3           1 day ago
    http://www.cardurl.com
    Show best performing cards first ⓘ  Off ⦿

☐  ⊘ Carousel name: DSC Carousel content name example
    This is the ad commentary. http://www.example.com
    Card Description Lorem Ipsum Bacon    1 of 5           5 days ago
    http://www.cardurl.com
    Show best performing cards first ⓘ  On ⦿

☐  ⊘ Carousel name: DSC Carouselcontent name example
    This is the ad commentary. http://www.example.com
    Card Description Lorem Ipsum Bacon    1 of 5           1 month ago
    http://www.cardurl.com
    Show best performing cards first ⓘ  On ⦿

◂Previous  11-20 of 100 updates  Next▸           View: 10 | 25 | 50 | All

Delete campaign  Save as draft                          Previous   Next

FIG. 2C

OPTIMIZATION OF NETWORK-TRANSFERRED MULTI-CARD CONTENT ITEMS

TECHNICAL FIELD

The present disclosure relates to content item delivery across one or more computer networks and, more particularly to, tracking and optimizing performance of multi-card content items.

BACKGROUND

The Internet allows end users operating computing devices to request content from many different publisher systems. Some publishers desire to send additional content items to users who visit their respective websites or who otherwise interact with the publishers. To do so, publisher systems rely on external content delivery services that deliver the additional content items over one or more computer networks to computing devices of such users.

Some providers of the additional content items rely on one or more content delivery services to electronically distribute their respective content items. Content delivery services implement a single content approach where a single piece of content from an external provider is presented within a single slot of content made available by a publisher system. However, such an approach limits the amount of content that the external provider can present to end users and that end-users can view.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIGS. 2A-2C are screenshots of user interfaces for creating a carousel content delivery campaign, in an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A method and system for tracking and optimizing performance of multi-card content items are provided. A multi-card content item is referred to herein as a carousel content item. A carousel content item allows content providers to provide potentially more content to an end-user in a single slot in web content. Prior to this approach, a content provider was limited to a "single card" content item. However, with more content to display, it is unknown which card content will have a greater impact on performance of the content item. Approaches described herein allow individual cards to be interacted with and tracked to determine which cards and which card orders have the greatest impact on content item performance. Even after a certain card configuration may be determined to perform the best, different card configurations may be tested continuously throughout a campaign as user interests evolve.

System Overview

Figure 1:
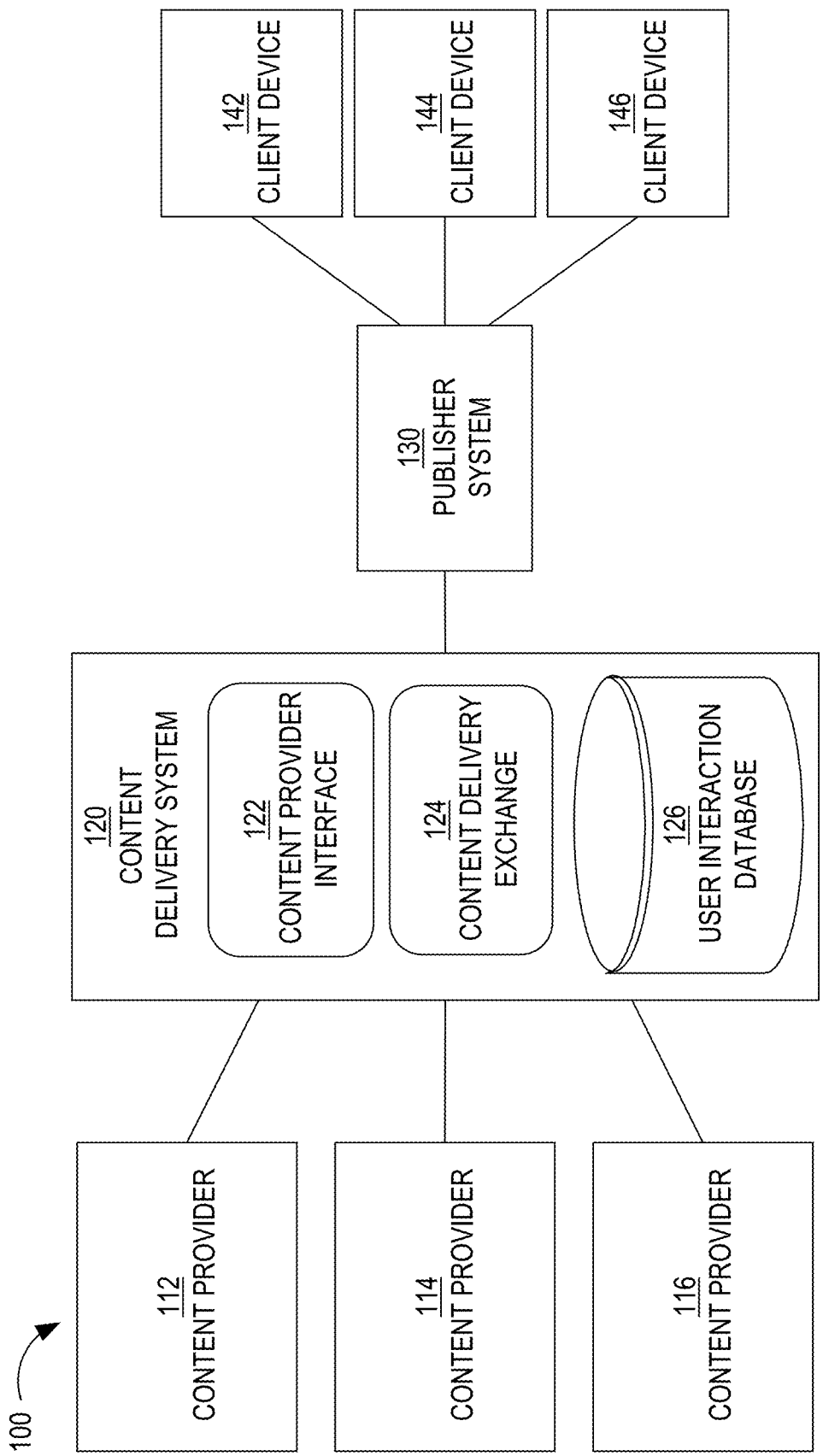
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a content delivery system 120, a publisher system 130, and client devices 142-146. Although three content providers are depicted, system 100 may include more or less content providers. Similarly, system 100 may include more than one publisher and more or less client devices.

Content providers 112-116 interact with content delivery system 120 (e.g., over a network, such as a LAN, WAN, or the Internet) to enable content items to be presented, through publisher system 130, to end-users operating client devices 142-146. Thus, content providers 112-116 provide content items to content delivery system 120, which in turn selects content items to provide to publisher system 130 for presentation to users of client devices 142-146. However, at the time that content provider 112 registers with content delivery system 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 includes (1) a content provider interface 122 that allows content providers 112-116 to create and manage their respective content delivery campaigns and (2) a content delivery exchange 124 that conducts content item selection events in response to content requests from a third-party content delivery exchange and/or from publisher systems, such as publisher system 130.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 130 or by the client device that requested the original content from publisher system 130. For example, a web page that the client device renders includes one or more calls (or HTTP requests) to content delivery exchange 124 for one or more content items. In response, content delivery exchange 124 provides (over a network, such as a LAN, WAN, or the Internet) one or more particular content items to the client device directly or through publisher system 130. In this way, the one or more particular content items may be presented (e.g., displayed) concurrently with the content requested by the client device from publisher system 130.

In response to receiving a content request, content delivery exchange 124 initiates a content item selection event that involves selecting one or more content items (from among multiple content items) to present to the client device that initiated the content request. An example of a content item selection event is an auction.

Content delivery system 120 and publisher system 130 may be owned and operated by the same entity or party. Alternatively, content delivery system 120 and publisher system 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 124, and that bids for space (on one or more publisher systems, such as publisher system 130) to present content items on behalf of multiple content providers. Thus, a bidder is another source of content items that content delivery exchange 124 may select for presentation through publisher system 130. Thus, a bidder acts as a content provider to content delivery exchange 124 or publisher system 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery system 120 through, for example, content provider interface 122. An example of content provider interface 122 is Campaign Manager™ provided by LinkedIn. Content provider interface 122 comprises a set of user interfaces that allow a representative of a content provider to create an account for the content provider, create one or more content delivery campaigns within the account, and establish one or more attributes of each content delivery campaign. Examples of campaign attributes are described in detail below.

A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users. (In most content delivery systems, targeting criteria cannot be so granular as to target individual members.) Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 124 receives, from a computing device, a request that does not satisfy the targeting criteria, then content delivery exchange 124 ensures that any content items associated with the particular content delivery campaign are not sent to the computing device.

Thus, content delivery exchange 124 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 130 may not satisfy targeting criteria of one content item of a campaign, the same content request may satisfy targeting criteria of another content item of the campaign.

Different content delivery campaigns that content delivery system 120 manages may have different charge models. For example, content delivery system 120 (or, rather, the entity that operates content delivery system 120) may charge a content provider of one content delivery campaign for each presentation of a content item from the content delivery campaign (referred to herein as cost per impression or CPM). Content delivery system 120 may charge a content provider of another content delivery campaign for each time a user interacts with a content item from the content delivery campaign, such as selecting or clicking on the content item (referred to herein as cost per click or CPC). Content delivery system 120 may charge a content provider of another content delivery campaign for each time a user performs a particular action, such as purchasing a product or service, downloading a software application, or filling out a form (referred to herein as cost per action or CPA). Content delivery system 120 may manage only campaigns that are of the same type of charging model or may manage campaigns that are of any combination of the three types of charging models.

A content delivery campaign may be associated with a resource budget that indicates how much the corresponding content provider is willing to be charged by content delivery system 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 124 receives triggers a content item selection event.

For example, in response to receiving a content request, content delivery exchange 124 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 124 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery system 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 124 conducts one or more content item selection events. Thus, content delivery exchange 124 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that operates content delivery system 120 conducts one or more content item selection events. In this latter embodiment, content delivery system 120 sends one or more content items to the other exchange, which selects one or more content items from among multiple content items that the other exchange receives from multiple sources. In this embodiment, content delivery exchange 124 does not necessarily know (a) which content item was selected if the selected content item was from a different source than content delivery system 120 or (b) the bid prices of each content item that was part of the content item selection event. Thus, the other exchange may provide, to content delivery system 120, information regarding one or more bid prices and, optionally, other information associated with the content item(s) that was/were selected during a content item selection event, information such as the minimum winning bid or the highest bid of the content item that was not selected during the content item selection event.

Overview of Tracking User Interactions

Content delivery system 120 tracks one or more types of user interactions across client devices 142-146 (and other client devices not depicted). For example, content delivery system 120 determines whether a content item that content delivery exchange 124 delivers is presented at (e.g., displayed by or played back at) a client device. Such a "user interaction" is referred to as an "impression." As another example, content delivery system 120 determines whether a content item that exchange 124 delivers is selected by a user of a client device. Such a "user interaction" is referred to as a "click." Content delivery system 120 stores such data as user interaction data, such as an impression data set and/or a click data set. Thus, content delivery system 120 may include a user interaction database 126.

For example, content delivery system 120 receives impression data items, each of which is associated with a different instance of an impression and a particular content delivery campaign. An impression data item may indicate a particular content delivery campaign, a specific content item, a date of the impression, a time of the impression, a particular publisher or source (e.g., onsite v. offsite), a particular client device that displayed the specific content item, and/or a browser cookie. Thus, if content delivery system 120 manages multiple content delivery campaigns, then different impression data items may be associated with different content delivery campaigns. One or more of these individual data items may be encrypted to protect privacy of the end-user.

Similarly, a click data item may indicate a particular content delivery campaign, a specific content item, a date of the user selection, a time of the user selection, a particular publisher or source (e.g., onsite v. offsite), a particular client device that displayed the specific content item, and/or a browser cookie. If impression data items are generated and processed properly, a click data item should be associated with an impression data item that corresponds to the click data item.

Carousel Content Items

A "carousel" content item is a content item that comprises a set of multiple cards, each card comprising an image and, optionally, text. A carousel content item allows a content provider to tell a story or to at least present additional information to end-users about a product, service, event, or cause, even though a slot within which the content item is to be presented is limited in size.

Each card in a carousel content item is visually distinct from each other card in the carousel content item. For example, a white line may be delineated one card from the next. As another example, each card may comprise an image that is clearly different than each other card's image, such as images of the same runner in different running positions. Alternatively, the image of each card in a carousel content item may be part of a larger image such that, when placed next to one or more other images of one or more other cards, the combination of cards (like puzzle pieces) reflect a larger whole, such as different, but contiguous, views of a particular landscape.

In an embodiment, each card is associated with a reference to a landing page (e.g., in the form of a URL), which is a page that is loaded onto the end-user's computing device in response to the user selecting a content item or a card. The page may be loaded into the same browser that presents the content item (e.g., in the case of a web browser, such as Internet Explorer) or into a different browser (e.g., in the case where a mobile application provided by publisher system 130 presents the content item). The page may be hosted by the content provider or by another third-party entity relative to publisher system 130. In a related embodiment, different cards of the same carousel content item are associated with different landing pages.

In an embodiment, a strict subset of cards in a set of cards of a carousel content item are viewable at once. In order to view each card in the set of cards, a user must provide input to view one or more other cards that are not (at least initially) fully visible. For example, a viewport or slot in which a content item is presented may be large enough to include only a single card. However, a scroll bar, arrows, or other graphical element may be displayed in the viewport adjacent to such a card to indicate that additional cards are available for viewing. As another example, at least two cards are visible at a time, but at least one of the cards is only partially visible. As a specific example, only one and a half cards may be visible at a time through a viewport for the carousel content item.

At the time of content delivery campaign creation, a content provider provides, through a graphical user interface provided by content delivery exchange 124, input that indicates that a content item is a carousel content item. Such input may comprise explicit input, such as selection of a radio button that indicates that the content item is of a carousel type. Alternatively, the uploading of multiple images/video to content delivery exchange may imply that a content item is of the carousel type.

In an embodiment, an initial order is associated with a carousel content item. The order dictates which card is first, which card is second, and so forth. The order may be implied based on an order in which card information is uploaded to content delivery exchange 124.

In an embodiment, an order in which cards of a carousel content item are presented varies. For example, for one period of time, the cards of a carousel content item are presented in a first order, but for a subsequent period of time, the cards are presented in a second order. As another example, for one user, the cards of a carousel content item are presented in a first order, but for a different user, the cards are presented in a second order.

Creating a Carousel Content Delivery Campaign

Figure 2A:
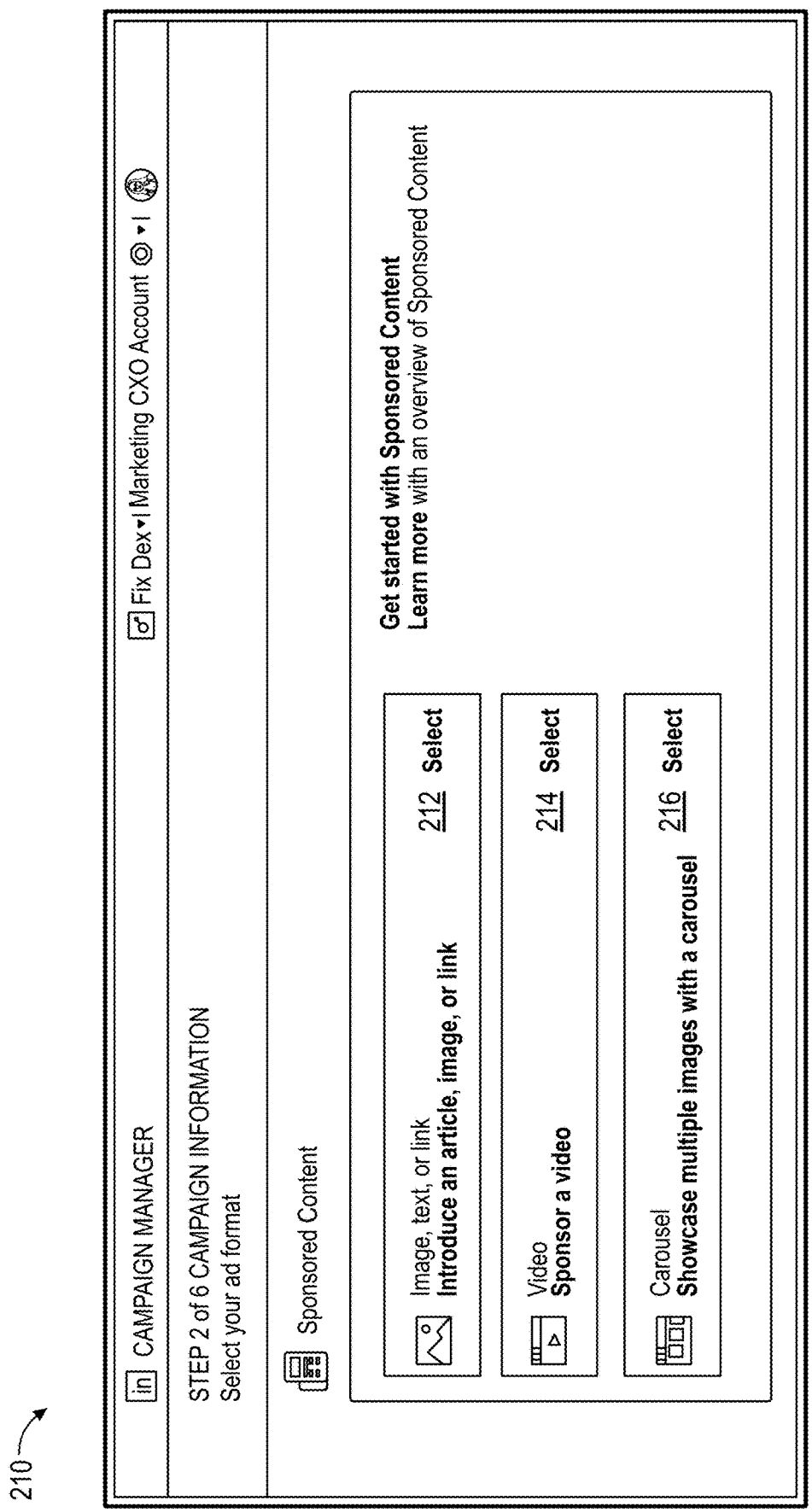
Figure 2B:
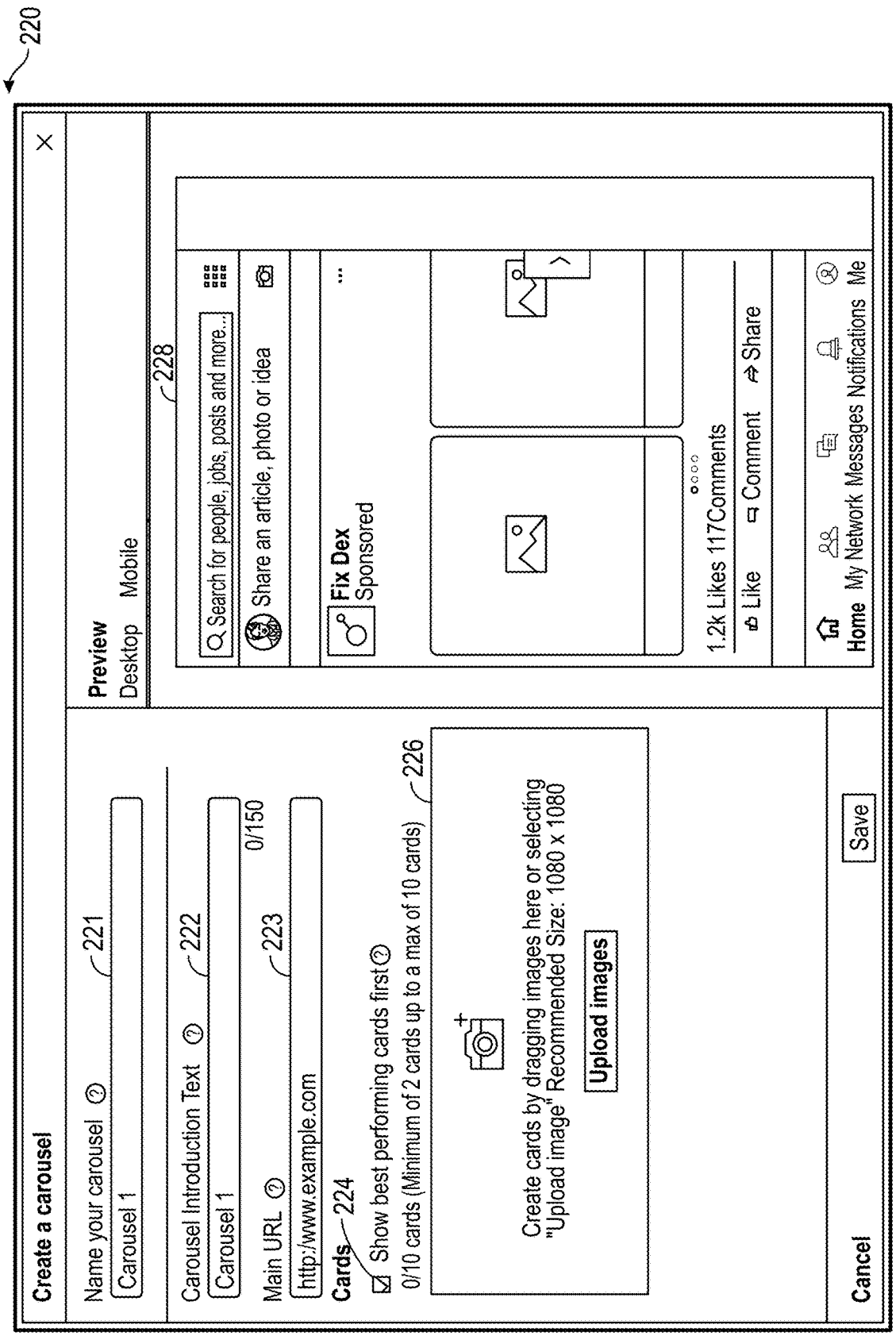

FIGS. 2A-2C are screenshots of user interfaces for creating a carousel content delivery campaign, in an embodiment. The screenshots may be of a web application provided by content delivery exchange 124 that allows different content providers to create, delete, modify, activate, and/or deactivate content delivery campaigns.

FIG. 2A is a screenshot of an example content item format selection page 210 that allows a content provider to select one of multiple types of content item formats for a content delivery campaign, in an embodiment. Content item format selection page 210 includes:

a "regular" content item format 212 that involves an article, image, and/or text that originates from the content provider;

a video content item format 214 that involves a video that originates from the content provider; and a carousel content item format 216 that involves multiple images that originate from the content provider.

FIG. 2B is a screenshot of an example carousel creation page 220 that allows a content provider to create a carousel content item, in an embodiment. Carousel creation page 220 includes a name field 221 to input a name for the carousel content item, an introduction text field 222 to input text that will appear on the carousel content item, a URL field 223 to input a URL to which the carousel content item points or references, a performance option 224 that, if selected, means that the best performing card will be presented first in order, an upload image field 226 that allows the content provider to upload multiple images (each of which will be part of a different card), and a preview field 228 that allows the content provider to preview how the carousel content item might appear to an end-user viewing the carousel content item on his/her computing device. Preview field 228 also allows the content provider to preview how the carousel content item may appear through a mobile device application and through a desktop application (e.g., web browser).

FIG. 2C is a screenshot of an example carousel campaign creation page 230 that allows a content provider to sponsor one or more carousel content delivery content items (or creatives), in an embodiment. Activating a campaign causes the campaign to be part of future content item selection events. In an inactive state, any content items associated with the campaign will not be selected for presentation during any content item selection event. In this example, carousel campaign creation page 230 includes an option to select one of four possible carousel content delivery content items that are not currently active. For each content item, carousel campaign creation page 230 indicates when the content item was created and includes an option to preview the content item and edit the content item. For each content item, carousel campaign creation page 230 displays a title of the content item, an image for the first card, thumbnail images of each card of the content item, and a current performance setting that may be modified with user input.

Example Carousel Content Item

Figure 3:
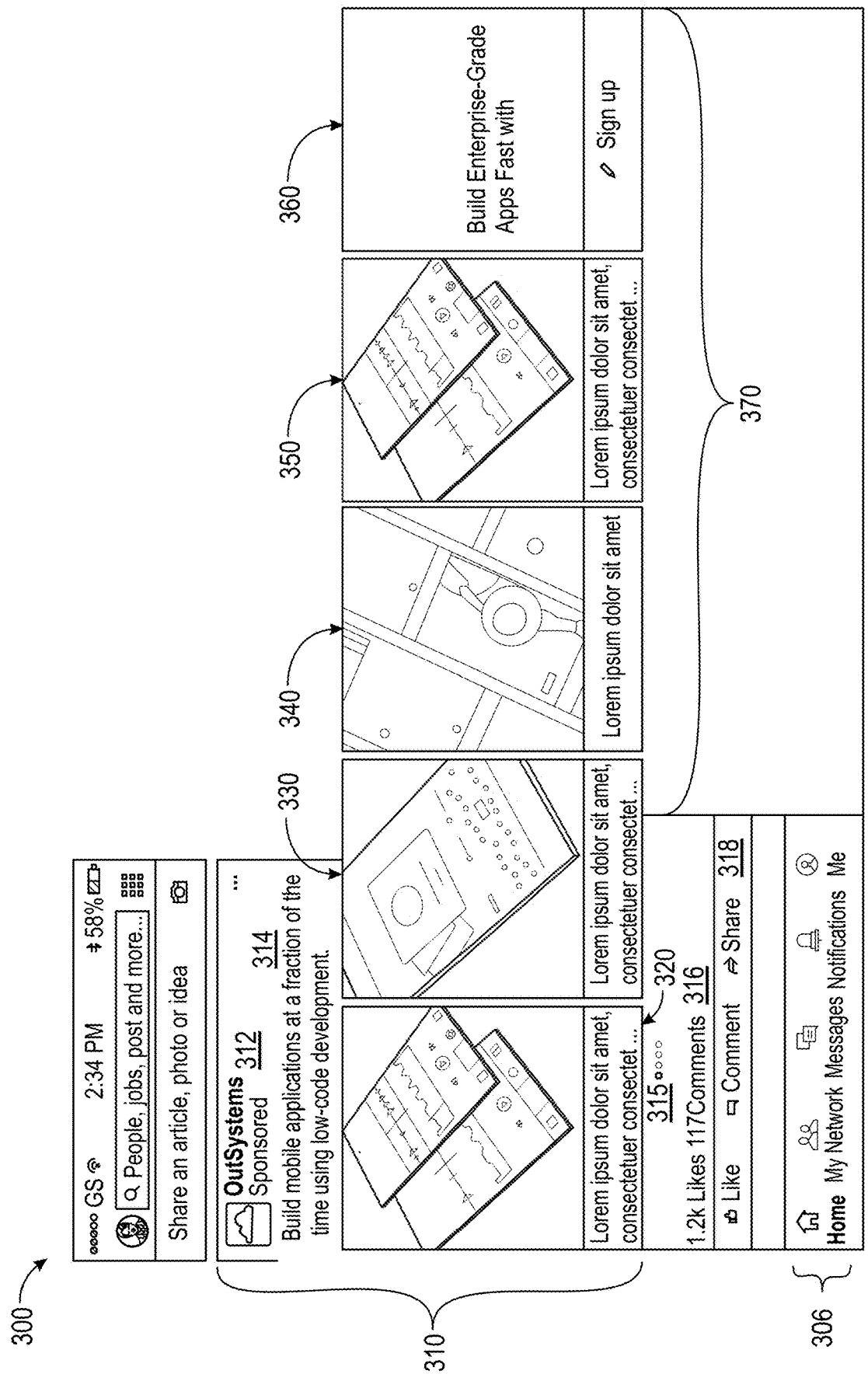
FIG. 3 is a diagram that includes a screenshot of an example user interface and an example carousel content item presented through the example user interface, in an embodiment.

FIG. 3 is a diagram that includes a screenshot of an example user interface 300 and a carousel content item 310, in an embodiment. Although user interface 300 is on a mobile device, other UIs may be UIs generated by a web browser rendering code of a web page. User interface 300 includes a search field 302 for a user of a computing device that display user interface 300 to insert text and initiate a search. User interface 300 includes an option selector 304 that, if selected, causes multiple options to be displayed, such as an option to display/edit the user's profile. User interface 300 also includes content views 306 that comprises five possible content views: a home view, a "my network" view, a message view, a notifications view, and a "my" profile view. In this example, the home view is currently selected and presented. The home view includes a feed that allows a user to scroll through different feed items, such as news items and postings by friends/connections.

A "my network" view allows a user to view information about friends/connections of the user in a social network. A message view includes data about messages sent and/or received by the user. The message view allows the user to view old messages and to compose and send new messages. A notifications view allows the user to view notifications about activities of friends/connections of the user and/or of organizations that the user has followed. A "my" profile view allows a user to view and update his/her profile.

Carousel content item 310 includes a name 312 of a service provider ("OutSystems") and text 314, which is the introduction of the content to render. User interface 300 includes statistics 316 (such as a number of likes and a number of comments) pertaining to carousel content item 310 and social options 318, including liking, commenting, and sharing. Each social option 318 causes a different result. For example, a user "liking" a content item causes a notification to be sent to individual feeds of friends or connections of the user. A user "commenting" on a content item allows the user to compose a comment and have that comment associated with that content item and, thus, be visible to other viewers of the content item, even viewers who are not friends or connections of the user. A user "sharing" a content item allows a user to specify one or more other users (e.g., friends or connections of the user) to receive a message that refers to or is about the subject of the content item.

In this example, carousel content item 310 includes five cards: 320, 330, 340, 350, and 360. Each card includes an image, text, and, optionally, (though not depicted) a link, such that if the image or text is selected, the link is activated and a new content is presented or loaded onto the client device that displays carousel content item 310. Card 360 includes a sign up link that, when selected, causes a sign up page to be presented. The sign up page may be provided (and hosted) by an external (different) service than content delivery exchange 124 or publisher system 130.

Section 370 defines content from carousel content item 310 that is not displayed on user interface 300, at least initially. In this example, user interface 300 includes enough space for one and a half cards. Section 370 includes cards 340-360 and part of card 330. Thus, the other part of card 330 and card 320 are visible to a user viewing user interface 300. A user is able to provide input to scroll through cards 320-360. For example, if a user selects one of dots 315, then card 320 disappears, card 330 is presented fully in user interface 300, and (the left) part of card 340 is presented in user interface 300. Moving cards 320-360 may also be (or instead) be initiated by (a) a user's finger swiping over one of the visible cards from right to left (or vice versa, depending on which way the user wants to scroll through the cards) or (b) (if a cursor device is involved) selecting card 320 or a visible spot of card 330 with a cursor and (while holding down a button on the cursor device) moving the cursor to the left.

Tracking Card Impressions

When a content item is presented on a client device, the client device transmits to a tracking service (e.g., internal to, or external to, content delivery exchange 124) an impression message that reports on an impression event (or simply "impression"). An impression message identifies the presented content item and one or more attributes of the content item and/or of the corresponding content delivery campaign. The impression message may be an HTTP message and the one or more attributes may be encoded in a uniform resource locator (URL), such as a content item identifier and/or a content delivery campaign identifier. The determination that a content item is displayed and that an impression message should be generated may be performed by an application that presents the content item, such as a smartphone application or a web browser application executing code retrieved from content delivery exchange 124 or publisher system 130.

In an embodiment, when a carousel content item is presented on a client device, the client device transmits (e.g., to content delivery exchange) at least two impression messages: a content item-level impression message and a card-level impression message. A card-level impression message is transmitted for each card of the carousel content item that is presented. A certain percentage of a card may need to be presented (e.g., 50% or 85%) before a card-level impression message is generated and transmitted for that card.

A content item-level impression message and a card-level impression message are both examples of impression data items. However, a card-level impression message includes information about an individual card that was presented. Examples of such information include a card identifier and a position indicator. A card identifier is a value (e.g., set of alphanumeric characters) that is unique relative to other cards in the corresponding carousel content item. For example, a card identifier may be '0' for a first card of a carousel content item, a card identifier may be '1' for a second card of the carousel content item, and so forth. (The card identifier may represent an initially ordering of cards of a carousel content item.) Thus, cards from different carousel content items may be associated with the same card identifier. In such a scenario, in order to uniquely identify a particular card from other cards of other content items, a combination of (a) a card identifier and a content item identifier, (b) a card identifier and a content delivery campaign identifier, or (c) a card identifier, a content item identifier, and a content delivery campaign identifier may be used. Alternatively, a card identifier is globally unique, such that no other card in a database of carousel content items shares the same card identifier.

A position indicator associated with a card indicates which position the card appeared in a particular presentation of the corresponding carousel content item. For example, a position indicator of '0' indicates the first position, a position indicator of '1' indicates the second position, and so forth. Thus, if a position indicator indicates an Nth position, then there are at least N cards in the corresponding carousel content item.

Because a card-level impression message is generated for each presentation of a card, multiple card-level impression messages may be generated. For example, upon display of a carousel content item, a content item-level impression message is generated (and transmitted) and a card-level impression message is generated (and transmitted). Then, for each other card from the carousel content item that is presented, a card-level impression message is generated and transmitted. Thus, if a carousel content item includes ten cards and all ten cards are presented to a user (e.g., that scrolls through and views each one), then eleven impression messages are generated and transmitted.

In an embodiment, a user is able to view the same card at different times during the same session. A user session may be defined as a period of time in which a user with a unique IP address spends on a web site, a particular web page, or a particular mobile application. A user session may have a maximum length of time, such as 30 minutes. Thus, if two impression events pertaining to the same content item occurred within 30 minutes of each other, then the second impression event is ignored for reporting or charging purposes.

For example, the first card of a carousel content item is presented to a user who then provides input to scroll through and view other cards of the carousel content item. The user then provides input to scroll back and view the first card again. In an embodiment, each presentation of a card triggers generation and transmission of a card-level impression message, even though a card-level impression message was already generated and transmitted for that card during the same user session. Thus, the following is an example of content of impression messages that might be generated in a particular order:

<impression: content item=1234>
<impression: content item=1234; card ID=1; position=0>
<impression: content item=1234; card ID=2; position=1>
<impression: content item=1234; card ID=3; position=2>
<impression: content item=1234; card ID=2; position=1>
<impression: content item=1234; card ID=1; position=0>
<impression: content item=1234; card ID=2; position=1>

In this example, the first three cards were presented in order, then the second card was presented again, followed by a second presentation of the first card. Finally, the second card was presented a third time. In this example, the first impression message does not contain card-related information. Lack of card-related information may be one way in which the tracking service distinguishes between a content item-level event and a card-level event. Alternatively, an impression message may include a field that specifies a content item type, such as "item type=carousel" for content items of the carousel type or "item type=non-carousel" for content items of the non-carousel (or traditional) type.

In an embodiment, a card-level impression message includes a sequence number that indicates a number of times that a corresponding card has been presented during a particular session. Thus, in light of the above example, the following example impression messages may be generated:

<impression: content item=1234>
<impression: content item=1234; card ID=1; position=0; sequence=0>
<impression: content item=1234; card ID=2; position=1; sequence=0>
<impression: content item=1234; card ID=3; position=2; sequence=0>
<impression: content item=1234; card ID=2; position=1; sequence=1>
<impression: content item=1234; card ID=1; position=0; sequence=1>
<impression: content item=1234; card ID=2; position=1; sequence=2>

Even though card-level impression messages may be generated and transmitted in a particular order, the order in which they are received and processed by a tracking service may be different. For example, content delivery exchange 124 (or an external tracking service that is affiliated with content delivery exchange 124) may receive the above impression messages in reverse order. Nevertheless, content delivery exchange 124 may use the sequence number to ignore certain messages. For example, all impression messages with a sequence value greater than '0' are ignored. Such treatment may be due to content delivery exchange 124 only considering the first impression.

Ignoring certain impression messages may be performed for one or more reasons. For example, content delivery exchange 124 may report only the first time a card was presented during a user session. Such reporting may be due to charging purposes. For example, content delivery exchange 124 may only desire to charge for unique card impressions during a single user session, not for multiple card impressions of the same card during the same user session. Nevertheless, detecting that a card was presented multiple times to the same user during the same session may be useful in understanding how users interact with a carousel content item. For example, if the median number of times a particular card in a carousel content item is presented to a user during the same session is three while the median number of times other cards from the same carousel content item are presented is two, one, or zero, then something about that particular card is engaging. Knowing this information may cause the order in which the cards of the carousel content item are presented in future impression events to change. For example, the particular card may be placed first or second in card order (as opposed to third or fourth) in order to entice users to provide input to view more cards of the carousel content item.

Processing Impression Messages

Figure 4:
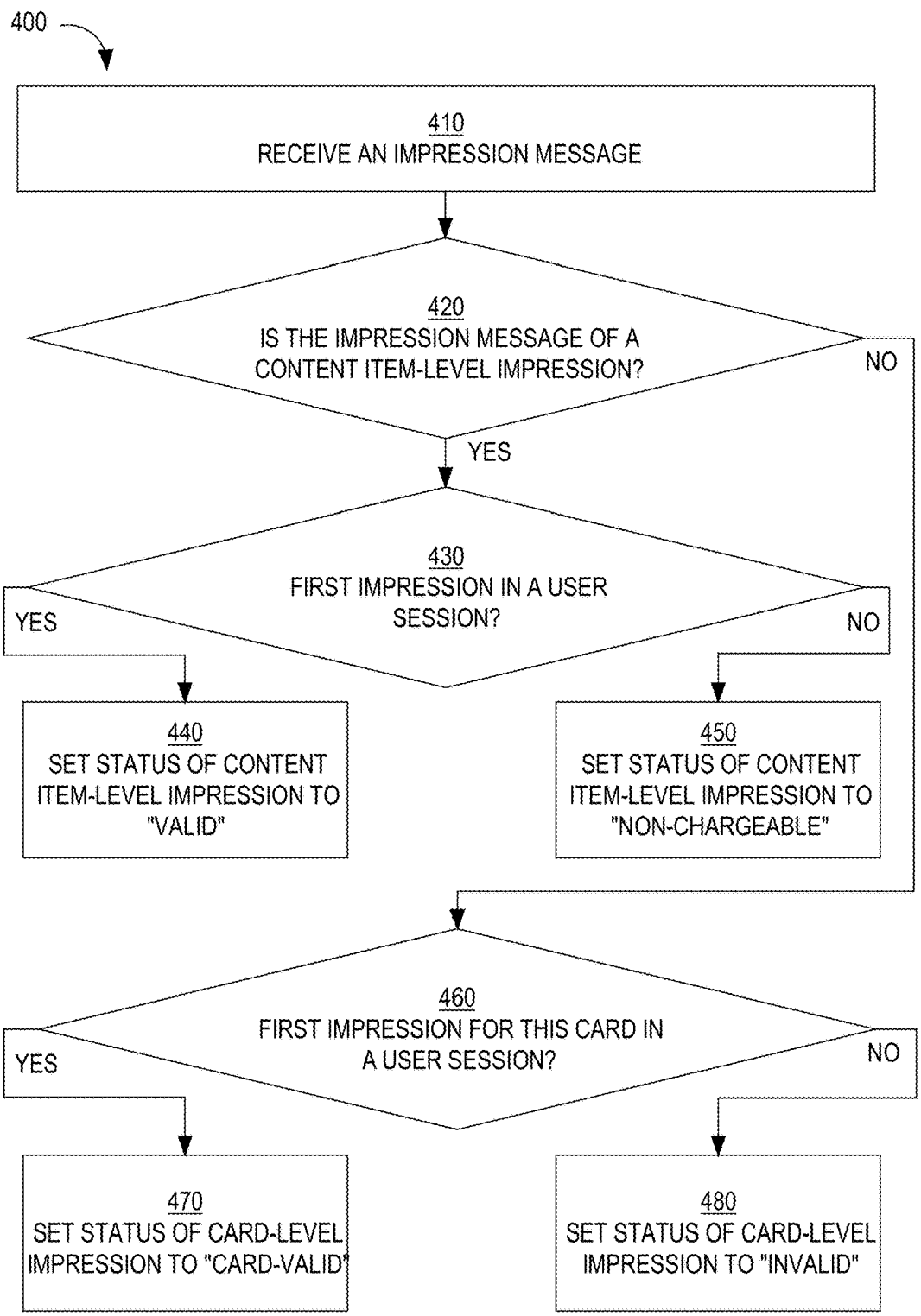
FIG. 4 is a flow diagram that depicts a process for processing impression messages, in an embodiment.

FIG. 4 is a flow diagram that depicts a process 400 for processing impression messages, in an embodiment. Process 400 may be performed by a tracking service that is internal to, or external to, content delivery exchange 124. Process 400 is performed for each impression message that is received.

At block 410, an impression message is received. The impression message is generated by a client device and transmitted over a network to the tracking service. The impression message may be of a content item or of a card within a carousel content item.

At block 420, a determination is made whether the impression message is of a content item-level impression or of a card-level impression. Block 420 may involve determining whether the impression message includes a card indicator, such as a card sequence number. If not (e.g., a value for the card indicator is NULL or a card indicator field is missing from the impression message), then the impression message is of a content item-level impression and process 400 proceeds to block 430. If it is determined that the impression message is of a card-level impression, then process 400 proceeds to block 460.

At block 430, a determination is made whether the impression message is the first impression message from a particular user session. For example, multiple content item-level impression messages may have been generated and transmitted for the same content item during the same user session. Block 430 may involve determining whether the impression message includes a sequence number of '0', which indicates that the impression message is the first impression message from a particular user session. Even if it is determined that the impression message is the first impression message from a particular user session, it does not necessarily mean that there are other content item-level impression messages from the particular user session.

If the determination in block 430 is positive, then process 400 proceeds to block 440, where a status of the impression message is set to "valid." A "valid" content item-level impression is one that may be used to (1) charge the corresponding content provider and/or (2) determine a performance of the corresponding content item. If, for example, multiple impression messages are received pertaining to the same content item for the same user session, it is undesirable to include the duplicate impressions because duplicate impressions make performance statistics for the content item inaccurate. A valid content item-level impression may be aggregated across one or more dimensions, such as user, a user attribute (e.g., job title, geography), client device (e.g., number of impressions from a particular client device), operating system type (e.g., number of impressions that occurred through a computing device running an Android operation system), content item (e.g., number of impressions of a particular content item, or number of impressions of a particular content items during a particular time period), content delivery campaign (e.g., number of impressions of content items pertaining to a particular campaign), etc. Some aggregations pertaining to a particular content item or a particular campaign may be presented (e.g., in the form of a report) to a content provider that initiated the particular content item/campaign. Some aggregations may be presented to one or more administrators of content delivery exchange 124 to inform them of how exchange 120 is performing, which data may be used to identify potential system issues.

If the determination in block 430 is negative (e.g., the sequence number is >0), then process 400 proceeds to block 450, where a status of the impression message is set to non-chargeable. A non-chargeable impression is one that should not be charged to the corresponding content provider (i.e., that provided the corresponding content item).

At block 460 (where the impression message is of a card-level impression), it is determined whether the impression message is the first impression message pertaining to the corresponding card during a particular user session. Block 460 may involve determining whether a card indicator (e.g., a sequence number) is set to '0'; if so, then the impression message is the first impression message pertaining to the corresponding card during the particular user session. Process 400 proceeds to block 470, where a status of the impression message is set to "card-valid." A "card-valid" card-level impression is one that may be used to determine a performance of the corresponding card, but not necessarily to charge the corresponding content provider if the corresponding content delivery campaign is a CPM campaign. For example, card-level impressions pertaining to a particular card may be aggregated to determine a user selection rate (e.g., a click-through rate) of the particular card.

If the determination in block 460 is negative (e.g., a card sequence number is >0), then process 400 proceeds to block 480, where a status of the impression message is set to "invalid." Thus, the impression message is not the first impression message pertaining to the corresponding card during the particular user session. Another impression message pertaining to the corresponding card during the particular user session must have been processed previously or may not have been processed yet, since impression messages are not guaranteed to be received in the order in which the impression messages are generated and transmitted. An "invalid" card-level impression message may or may not be used for analytic and/or reporting purposes.

Tracking Card Clicks

When a content item is selected (e.g., clicked) by a user, the user's client device transmits (e.g., to a tracking service that is internal to, or external to, content delivery exchange 124) a click message that identifies the content item and one or more attributes of the content item and/or of the content delivery campaign. User selection may comprise (a) a user's finger touching a certain portion of a touchscreen (of a client device) on which the card is displayed or (b) the user selecting a button on a cursor device while a cursor is placed over the card displayed on a screen of the client device. The click message may be an HTTP message and the one or more attributes may be encoded in a uniform resource locator (URL), such as a content item identifier and/or a content delivery campaign identifier. The determination that a content item is clicked and that a click message should be generated may be performed by an application that presents the content item, such as a smartphone application or a web browser application executing code retrieved from content delivery exchange 124 or publisher system 130.

In an embodiment, when a carousel content item is clicked, the client device transmits (e.g., to content delivery exchange 124) a click message, which could either be a content item-level click message (when a user selection or click occurs relative to a content commentary area or other chargeable areas of the content item) and a card-level click message. A card-level click message is transmitted for each card of the carousel content item that is selected or clicked.

A content item-level click message and a card-level click message are both examples of click data items. However, a card-level click message (similar to a card-level impression message) includes information about an individual card that was clicked. Examples of such information include a card identifier and a position indicator, both of which are described above with respect to impression messages.

Alternatively, a single card-level click message is generated and transmitted for each user click and there are no content item-level click messages. Either way, a click message includes a reference to a landing page (e.g., in the form of a URL).

In some scenarios, a user may select (e.g., click), during a single user session, the same card multiple times. In such scenarios, if the corresponding content delivery campaign is a CPC campaign, then the corresponding content provider is charged only once for all those selections.

In some scenarios, a user may select (e.g., click), during a single user session, different cards of the same carousel content item. In such scenarios, if the corresponding content delivery campaign is a CPC campaign and the different cards reference (e.g., using a URL) the same landing page, then the corresponding content provider is charged only once for those selections. Otherwise, if the corresponding content delivery campaign is a CPC campaign and the different cards reference different landing pages, then the corresponding content provider is charged for each selection.

Processing Click Messages

Figure 5:
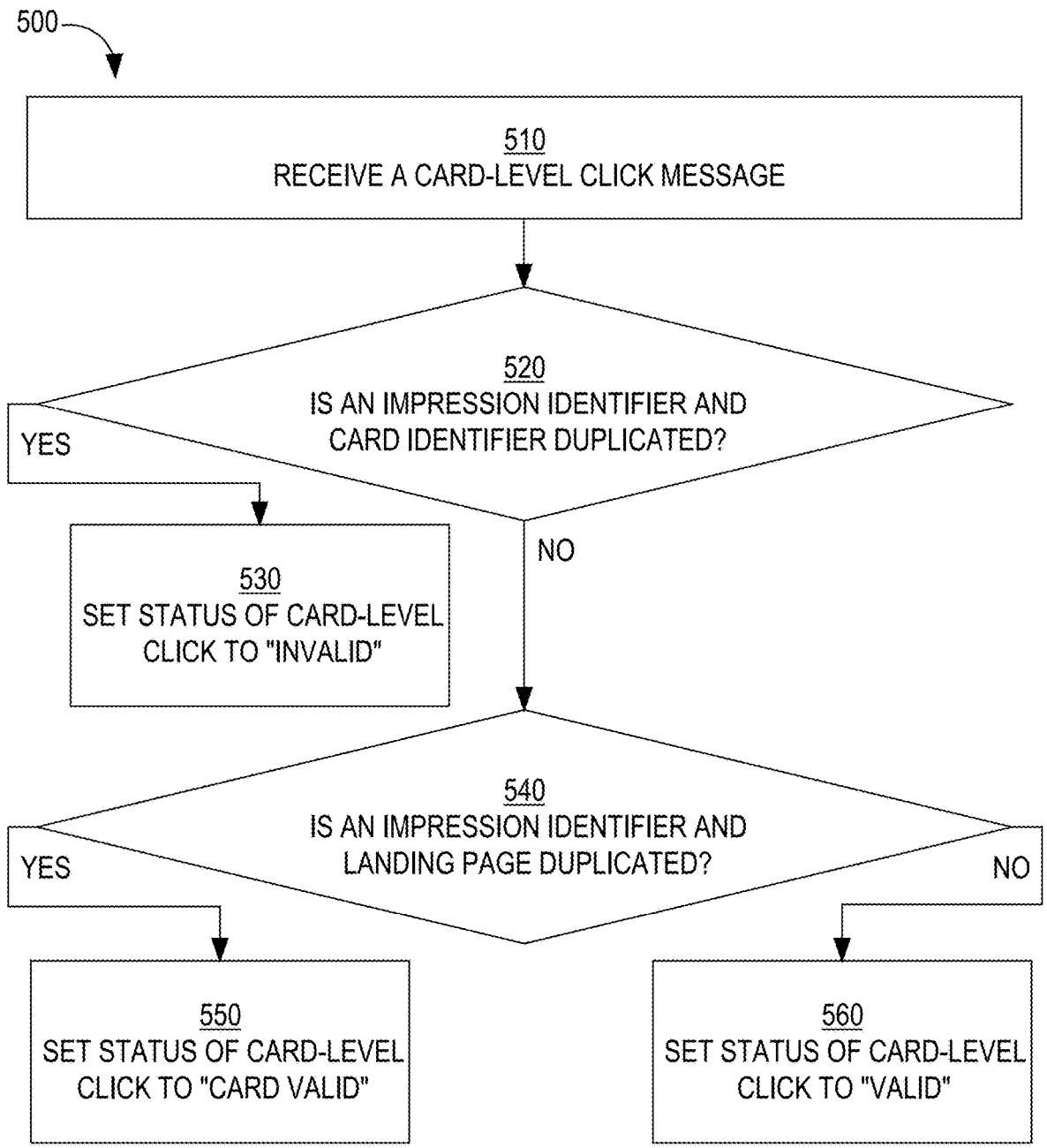
FIG. 5 is a flow diagram that depicts a process for processing click messages, in an embodiment.

FIG. 5 is a flow diagram that depicts a process 500 for processing click messages, in an embodiment. Process 500 may be performed by a tracking service that is internal to, or external to, content delivery exchange 124. Process 500 is performed for each click message that is received.

At block 510, a card-level click message is received. The card-level click message is generated by an end-user's computing device and transmitted over a network to the tracking service. A card-level click message may be distinguished from a content item-level click message based on whether the click message includes a card index value.

At block 520, a determination is made whether an impression identifier and the card identifier are duplicated. Due to system complexity, a client sometimes resends the same event message. For example, if a client does not receive, from a tracking service, a response indicating that the tracking service received an event message, then the client presumes that the event message was lost and will try to send the same event message again, when in fact the event message was successfully processed in some situations, but the response was lost.

An impression identifier uniquely identifies a user session. If a user clicks on a first card, swipes to other card, and then comes back to the first card and clicks the first card again, then a second click message will be received and deduplicated.

If the determination in block 520 is positive, then process 500 proceeds to block 530, where a status of the card-level click message is set to "invalid." An invalid card-level click arises in a scenario where the same user selected the same card multiple times. Otherwise, process 500 proceeds to block 540.

At block 540, a determination is made whether the impression identifier and a landing page URL indicated in the card-level click message are duplicated. Because content providers are charged based on unique landing page clicks for carousel content items, a combination of impression identifier and landing page URL is used as an unique key to deduplicate chargeable events. For example, if both a click on card 1 and a click on card 2 are valid clicks and they share the same landing page, then the second click on card 2 will be deduplicated for chargeability concerns.

Thus, if the determination in block 540 is positive, then process 500 proceeds to block 550, where a status of the card-level click message is set to "card-valid." A "card-valid" card-level click arises in the scenario where different cards of a carousel content item have been selected by a user during the same session and those different cards are associated with the same landing page. A content provider is not charged for "card-valid" card-level click messages. However, "card-valid" card-level click messages may be used for reporting and/or optimization purposes.

If, at block 540, it is determined that the impression identifier and the landing page URL indicated in the card-level click message are not duplicated, then process 500 proceeds to block 560.

At block 560, the status of the card-level click message is set to "valid." A "valid" card-level click arises in the scenario where (a) only a single card of a carousel content item has been selected during a user session or (b) multiple cards of the carousel content item have been selected during the user session, but the multiple cards are associated with different landing page URLs. Unlike "card-valid" card-level click messages, a content provider is charged only for "valid" card-level click messages. Like "card-valid" card-level click messages, "valid" card-level click messages may be used for reporting and/or optimization purposes.

Carousel Content Item Optimization

In an embodiment, a carousel content item is optimized based on event messages related to the carousel content item. Optimization may refer to re-ordering cards of a carousel content item or dropping/removing one or more cards from the carousel content item.

In an embodiment, a performance measure for each of one or more cards of a carousel content item is calculated. The performance measure(s) are used to optimize the carousel content item. Example performance measures of a card include number of impressions, number of selections (e.g., clicks), average or median time duration of impressions of the card, and user selection rate (e.g., click-through rate). For example, a user selection rate is calculated for each card in a particular content delivery campaign. The cards are then ordered based on their respective user selection rates, from highest to lowest. Future content item selection events that involve the carousel content item will cause the cards to be presented in that order.

As another example, a card with that is associated with the greatest percentage decrease in number of impressions from the card to a subsequent card is selected for removal from the set of cards of the carousel content item. For example, a carousel content item has cards A-E. Analysis of card-valid impression messages reveals that card A was presented 1,239 times, card B was presented 1,105 times, card C was presented 887 times, card D was presented 213 times, and card E was presented 165 times. Thus, there is an over 400% decrease from the number of card C views to the number of card D views, indicating that card C may have caused viewers to become disinterested in the carousel content item.

As another example, a median presentation duration is calculated for each card in a carousel content item and used to order the cards in that carousel content item. A "presentation duration" for a first card may be determined by subtracting a time associated with the a card-level impression message for the first card from a time associated with a card-level impression message for a second card that is adjacent to the first card. Such a card-level impression message for the second card indicates that the user is scrolling through the cards and is no longer focused on the first card. Alternatively, a user may scroll away from the carousel content item, which may be one content item among multiple content items available on a page or page view. Thus, when the carousel content item is no longer in view, then the application that presented the carousel content item (e.g., a mobile application or a web application executing in a web browser) transmits an end message with a certain timestamp that can be used (along with the time associated with the card-level impression message for the first card) to generate the presentation duration of the first card. Once a presentation duration statistic (e.g., average or median) for each card is calculated, the cards may be reordered based on those presentation duration statistics. For example, the card with the highest presentation duration may be placed first in order or second in order, which may cause more users to view the third card.

In an embodiment, a user selection rate is calculated differently for cards than for content items. For a non-carousel content item, a user selection rate is calculated based on dividing (1) a number of valid click messages pertaining to the content item by (2) a number of valid impression messages pertaining to the content item. For a carousel content item, a user selection rate is calculated similarly. However, for a card of a carousel content item, a user selection rate is calculated by dividing (1) the sum of (i) a number of valid card-level click messages pertaining to the card plus (ii) a number of card-valid click messages pertaining to the card by (2) a number of card-valid card-level impression messages. Thus, while card-valid card-level impression messages are used to calculate a user selection rate for a card, card-valid card-level impression messages are not used to calculate a user selection rate for a carousel content item. Also, while card-valid click messages are used to calculate a user selection rate for a card, card-valid click messages are not used to calculate a user selection rate for a carousel content item.

In an embodiment, automatic decisions to alter the order of cards of a carousel content item or to remove one or more cards from a carousel content item are first verified with the corresponding content provider before implemented. Thus, for example, a content provider must give approval before a card is removed from a carousel content item. Content provider approval may be given through a user interface to content delivery exchange 124 at the time of campaign creation or after the determination to perform the optimization. In the case of the latter scenario, a content provider may be notified of the possibility to perform a certain optimization through one or more messaging channels, such as email, text, or an application executing on a computing device of a content provider representative.

In an embodiment, the order in which cards of a carousel content item are presented varies automatically to determine whether card order causes a difference in content item-level performance or card-level performance. Explicit permission from the corresponding content provider may be required before automatically varying the order for this purpose. Automatically reordering cards may be performed regularly or randomly at different times. For example, a carousel content item with a particular card that is presented third in order may have a higher user selection rate than when the particular card is presented first in order. As another example, a first card may have a higher user selection rate when the first card is presented second in order than when the first card is presented third in order. After different orders are tested and performance measures (e.g., user selection rate, number of card impressions) are generated for each order, the performance measures are compared to determine which order yielded the best result (according to one or more criteria, such as content item-level user selection rate). The order that yielded the best result may be selected.

Segment-Specific Optimizations

The optimizations described above are applied to a carousel content item and the results are experienced by all users who subsequently view the carousel content item. However, in an embodiment, different optimizations are applied to the same carousel content item, depending on one or more attributes of a request that triggers initiation of a content item selection event that involves selecting the carousel content item. For example, for a first set of users, over a period of time, the cards of the carousel content item will be presented to that set of users in a first order while, for a second set of users, during the same period of time, the cards will be presented to the second set of users in a second order that is different than the first order. A reason for different users being presented with a different order of cards may be based on different performance measures calculated for different sets of attributes/dimensions.

In an embodiment, performance measures are calculated (1) across one or more dimensions (2) for each of one or more card configurations. A "card configuration" is a certain order of cards of a carousel content item or a certain set of cards of a carousel content item. For example, one card configuration is cards A-E being presented in a first order and another card configuration is cards A-E being presented in a different order. As another example, one card configuration is cards A-E being presented and another card configuration is cards B-E being presented (i.e., without card A).

Regarding dimensions for which a performance measure may be calculated for a particular card configuration, example dimensions include attributes of computing devices through which cards are presented, attributes of date/time in which cards are presented, attributes of users that interact with cards, and attributes of the order in which cards are presented. For example, a first user selection rate is calculated for a carousel content item whose cards presented, in a first card configuration, on mobile devices that are running a version of the Android operating system and a second user selection rate is calculated for the carousel content item presented, in a second card configuration, on mobile devices that are running the version of the Android operating system. Thus, if a content request that triggers selection of the carousel content item originates from a particular mobile device running the version of the Android operation system and the second user selection rate is higher than the first user selection rate, then the carousel content item will be presented on the particular mobile device in the second card configuration.

As another example, a first number of valid card impressions is calculated for a carousel content item whose cards are presented, in a first card configuration, to users that list a particular job industry in their respective user profiles while a second number of valid card impressions is calculated for the carousel content item whose cards are presented, in a second card configuration, to users that list the particular job industry in their respective user profiles. Thus, if a content request that triggers selection of the carousel content item originates from a user who lists the particular job industry in his/her profile and the first number of valid card impressions is higher than the second number of valid card impressions, then the carousel content item will be presented to the user in the first card configuration.

As another example, performance measures may be calculated for different card configurations with respect to different days of the week (e.g., weekday v. weekend) and/or different times of the day (e.g., before noon v. after noon). For example, a first card configuration of a carousel content item on weekdays may be associated with a higher user selection rate than a second card configuration of the carousel content item on weekdays. Conversely, the second card configuration of the carousel content item may have a better performance measure on weekends than the first card configuration. Thus, if a content request that triggers selection of the carousel content item is received on a weekday (as opposed to a weekend day), then the carousel content item will be presented to the user in the first card configuration. Also, if a content request is received on a weekend, then the carousel content item may be presented to the user in the second card configuration.

In an embodiment, a dimension for which performance measures are calculated may be a default dimension, such as a day or time dimension. Thus, regardless of the targeting criteria of a content delivery campaign that includes a carousel content item, certain dimension values are tested for different card configurations.

In a related embodiment, a set of one or more dimensions for which performance measures are calculated for a carousel content item may be automatically determined based on targeting criteria of the corresponding content delivery campaign. Then, different dimension values for the dimension (or set of dimensions) are tested for different card configurations to determine which card configurations are associated with the best performance given a certain set of dimension/attribute values. After testing different card configurations for different sets of content requests associated with different attribute values for a certain period of time (e.g., a week) or a certain number of impressions (e.g., 10,000) or clicks (e.g., 95), the testing is considered complete and a determination of which card configurations are associated with the best one or more performance measures given a certain set of attribute values is made. For example, if the targeting criteria indicates that a user must have one of two job titles specified in his/her profile in order to be targeted with the carousel content item, then different card configurations are tested for different users and performance measures calculated for each card configuration with respect to each job title. For example, users with job title A may have a higher user selection rate of a carousel content item in a first card configuration than of the carousel content item in a second card configuration, whereas users with job title B may have a higher user selection rate of the carousel content item in the first card configuration than of the carousel content item in the first card configuration.

Example Optimization Process

Figure 6:
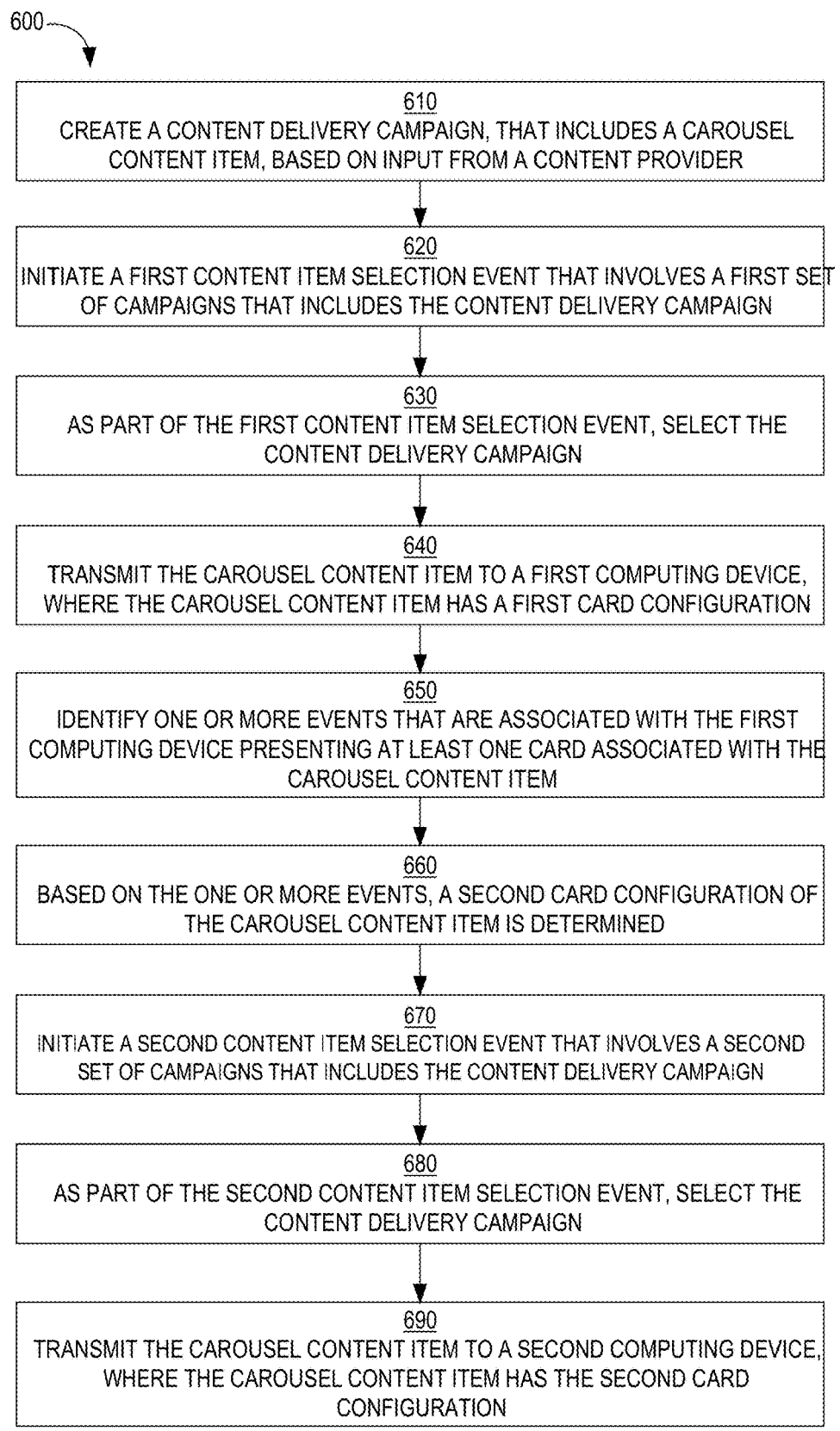
FIG. 6 is a flow diagram that depicts a process for optimizing a carousel content item, in an embodiment.

FIG. 6 is a flow diagram that depicts a process 600 for optimizing a carousel content item, in an embodiment. Process 600 may be implemented by content delivery exchange 124.

At block 610, a content delivery campaign is created based on input from a content provider. The content delivery campaign comprises a carousel content item that comprises multiple cards.

At block 620, a first content item selection event is initiated that involves a first set of content delivery campaigns that includes the content delivery campaign. The first content item selection event may be initiated based on receiving, over a computer network, a content request from a computing device.

At block 630, as part of the first content item selection event, the content delivery campaign is selected. The content delivery campaign may be selected based on one or more criteria, such as having the highest effective cost per impression, which may be based on a bid value associated with the content deliver campaign and, optionally, a predicted user selection rate associated with the content delivery campaign.

At block 640, the carousel content item is transmitted to a first computing device of a first user. The multiple cards of the carousel content item have a first card configuration. The first card configuration may be an initial card configuration established by the content provider.

At block 650, one or more events are identified that are associated with the first computing device presenting at least one card of the carousel content item. One of the events is a card-level impression that indicates a particular card of the carousel content item and a position of the particular card relative to other cards of the carousel content item. The one or more events may also include a content item-level impression.

At block 660, based on the one or more events, a second card configuration of the multiple cards is determined, where the second configuration is different than the first card configuration. The second card configuration may be determined also based on whether the particular card was selected (e.g., clicked) by the first user. The second card configuration may be based not only on the one or more events as a result of the first content item selection event, but also on events received as a result of one or more other content item selection events involving the content delivery campaign.

At block 670, a second content item selection event is initiated that involves a second set of content delivery campaigns that includes the content delivery campaign. The second content item selection event may be initiated based on receiving, over the computer network, a second content request from the same or different computing device.

At block 680, as part of the second content item selection event, the content delivery campaign is selected.

At block 690, the carousel content item is transmitted to a second computing device of a second user, where the multiple cards of the carousel content item have the second card configuration.

Technical Improvements

Embodiments described herein improve the utility of electronic content delivery systems for content providers and end users by allowing more provider content to be presented to end users even though screen size remains the same. Embodiments also improve performance of carousel content items by tracking performance properly and, optionally, altering their respective card configurations.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
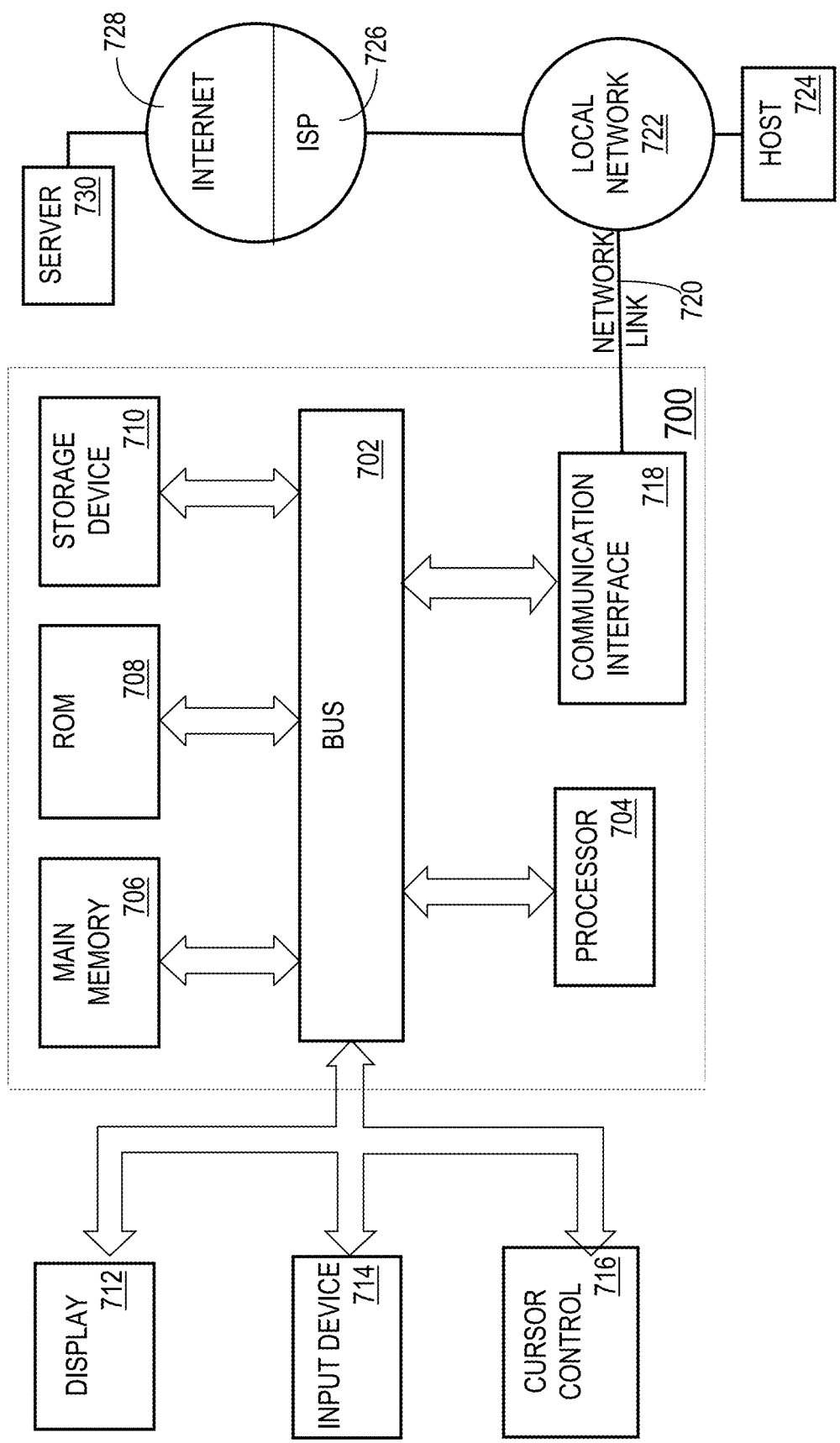
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    storing, based on input from a content provider, a first content delivery campaign that comprises a content item that comprises a plurality of cards, wherein content of each card of the plurality of cards originates from the content provider;
    as part of a first content item selection event, identifying a first plurality of content delivery campaigns and selecting the first content delivery campaign from among the first plurality of content delivery campaigns;
    causing the content item that comprises the plurality of cards to be transmitted to a first computing device of a first user, wherein the plurality of cards have a first card configuration that indicates a first order of the plurality of cards;
    identifying a plurality of events that are associated with the first computing device displaying multiple cards of the plurality of cards;
    wherein the plurality of events includes (1) a first event that indicates that a first card in the plurality of cards was presented on the first computing device and (2) a second event that indicates that a second card in the plurality of cards was presented on the first computing device;
    wherein the first event indicates a first position of the first card relative to other cards in the plurality of cards;
    wherein the second event indicates a second position of the second card relative to other cards in the plurality of cards;
    based on the plurality of events, determining a second card configuration, that indicates a second order of the plurality of cards, that is different than the first card configuration;
    as part of a second content item selection event, identifying a second plurality of content delivery campaigns and selecting the first content delivery campaign from among the second plurality of content delivery campaigns;
    causing the content item that comprises the plurality of cards to be transmitted to a second computing device of a second user, wherein the plurality of cards have the second card configuration;
    wherein the method is performed by one or more computing devices.

2. The method of claim 1, further comprising:
    based on a first set of events pertaining to the first card, calculating a first entity selection rate of the first card;
    based on a second set of events pertaining to the second card of the plurality of cards, calculating a second entity selection rate of the second card;

wherein determining the second card configuration is also based on the first entity selection rate and the second entity selection rate.

3. The method of claim 1, further comprising:
identifying a first particular event that indicates that the first card was selected by the first user during a particular session;
identifying a second particular event that indicates that the second card was selected by the first user during the particular session;
determining whether a landing page associated with the first card is the same as a landing page associated with the second card.

4. The method of claim 3, further comprising:
in response to determining that the landing page associated with the first card is the same as the landing page associated with the second card, ignoring either the first particular event or the second particular event when calculating a charge for the content provider.

5. The method of claim 3, further comprising:
in response to determining that the landing page associated with the first card is not the same as the landing page associated with the second card, considering both the first particular event and the second particular event when calculating a charge for the content provider.

6. The method of claim 1, further comprising:
receiving, from the first computing device, a plurality of card-related events, wherein each card-related event in the plurality of card-related events indicates that the first computing device presented a card in the plurality of cards;
wherein the plurality of card-related events includes a first card-related event that includes a first sequence value and that indicates that the first computing device presented the first card;
wherein the plurality of card-related events includes a second card-related event that indicates a second sequence value and that indicates that the first computing device presented the first card;
wherein the first sequence value is different than the second sequence value that indicates a minimum number of times that the first computing device presented the first card.

7. The method of claim 1, further comprising:
based on a set of events pertaining to the content item and related to a plurality of users, determining which cards of the plurality of cards were presented most often and which cards of the plurality of cards were selected by users most often.

8. The method of claim 1, further comprising:
identifying a plurality of content item-level events that pertain to the content item and that were generated by a plurality of computing devices;
identifying a plurality of card-level events that pertain to cards within the content item and that were generated by the plurality of computing devices;
analyzing the plurality of content item-level events to generate a content item-level statistic;
analyzing the plurality of card-level events to generate a card-level statistic;
sending, to the content provider, the content item-level statistic and the card-level statistic.

9. The method of claim 1, further comprising:
based on a set of events that pertain to the content item and the plurality of cards, analyzing user profile data pertaining to users that interacted with the content item;
determining first performance data of the first card relative to a first set of users that satisfy one or more first criteria;
determining second performance data of the first card relative to a second set of users that satisfy one or more second criteria that are different than the one or more first criteria;
initiating, for a third user, a third content item selection event that involves a third plurality of content delivery campaigns that includes the first content delivery campaign;
as part of the third content item selection event, selecting the first content delivery campaign;
after selecting the first content delivery campaign, determining that the third user satisfies the one or more second criteria;
in response to determining that the third user satisfies the one or more second criteria, associating the third user with the second performance data;
based on the second performance data, determining a third card configuration of the plurality of cards;
based on determining the third card configuration, causing the plurality of cards to be transmitted to a third computing device in the third card configuration.

10. The method of claim 1, further comprising:
based on a set of events that pertain to the content item and the plurality of cards, determining a performance of each card in the plurality of cards;
based on a performance of a third card in the plurality of cards, determining to remove the third card from the plurality of cards;
after determining to remove the third card, as part of a third content item selection event, selecting the content item;
causing, to be transmitted to a third computing device, the content item that comprises the plurality of cards that does not include the third card.

11. One or more non-transitory storage media storing instructions which, when executed by one or more processors, cause:
storing, based on input from a content provider, a first content delivery campaign that comprises a content item that comprises a plurality of cards, wherein content of each card of the plurality of cards originates from the content provider;
as part of a first content item selection event, identifying a first plurality of content delivery campaigns and selecting the first content delivery campaign from among the first plurality of content delivery campaigns;
causing the content item that comprises the plurality of cards to be transmitted to a first computing device of a first user, wherein the plurality of cards have a first card configuration that indicates a first order of the plurality of cards;
identifying a plurality of events that are associated with the first computing device displaying multiple cards of the plurality of cards;
wherein the plurality of events includes (1) a first event that indicates that a first card in the plurality of cards was presented on the first computing device and (2) a second event that indicates that a second card in the plurality of cards was presented on the first computing device;
wherein the first event indicates a first position of the first card relative to other cards in the plurality of cards;

wherein the second event indicates a second position of the second card relative to other cards in the plurality of cards;

based on the plurality of events, determining a second card configuration, that indicates a second order of the plurality of cards, that is different than the first card configuration;

as part of a second content item selection event, identifying a second plurality of content delivery campaigns and selecting the first content delivery campaign from among the second plurality of content delivery campaigns;

causing the content item that comprises the plurality of cards to be transmitted to a second computing device of a second user, wherein the plurality of cards have the second card configuration.

12. The one or more storage media of claim 11, wherein the instructions, when executed by the one or more processors, further cause:

based on a first set of events pertaining to the first card, calculating a first entity selection rate of the first card;

based on a second set of events pertaining to the second card of the plurality of cards, calculating a second entity selection rate of the second card;

wherein determining the second card configuration is also based on the first entity selection rate and the second entity selection rate.

13. The one or more storage media of claim 11, wherein the instructions, when executed by the one or more processors, further cause:

identifying a first particular event that indicates that the first card was selected by the first user during a particular session;

identifying a second particular event that indicates that the second card was selected by the first user during the particular session;

determining whether a landing page associated with the first card is the same as a landing page associated with the second card.

14. The one or more storage media of claim 13, wherein the instructions, when executed by the one or more processors, further cause:

in response to determining that the landing page associated with the first card is the same as the landing page associated with the second card, ignoring either the first particular event or the second particular event when calculating a charge for the content provider.

15. The one or more storage media of claim 13, wherein the instructions, when executed by the one or more processors, further cause:

in response to determining that the landing page associated with the first card is not the same as the landing page associated with the second card, considering both the first particular event and the second particular event when calculating a charge for the content provider.

16. The one or more storage media of claim 11, wherein the instructions, when executed by the one or more processors, further cause:

receiving, from the first computing device, a plurality of card-related events, wherein each card-related event in the plurality of card-related events indicates that the first computing device presented a card in the plurality of cards;

wherein the plurality of card-related events includes a first card-related event that includes a first sequence value and that indicates that the first computing device presented the first card;

wherein the plurality of card-related events includes a second card-related event that indicates a second sequence value and that indicates that the first computing device presented the first card;

wherein the first sequence value is different than the second sequence value that indicates a minimum number of times that the first computing device presented the first card.

17. The one or more storage media of claim 11, wherein the instructions, when executed by the one or more processors, further cause:

based on a set of events pertaining to the content item and related to a plurality of users, determining which cards of the plurality of cards were presented most often and which cards of the plurality of cards were selected by users most often.

18. The one or more storage media of claim 11, wherein the instructions, when executed by the one or more processors, further cause:

identifying a plurality of content item-level events that pertain to the content item and that were generated by a plurality of computing devices;

identifying a plurality of card-level events that pertain to cards within the content item and that were generated by the plurality of computing devices;

analyzing the plurality of content item-level events to generate a content item-level statistic;

analyzing the plurality of card-level events to generate a card-level statistic;

sending, to the content provider, the content item-level statistic and the card-level statistic.

19. The one or more storage media of claim 11, wherein the instructions, when executed by the one or more processors, further cause:

based on a set of events that pertain to the content item and the plurality of cards, analyzing user profile data pertaining to users that interacted with the content item;

determining first performance data of the first card relative to a first set of users that satisfy one or more first criteria;

determining second performance data of the first card relative to a second set of users that satisfy one or more second criteria that are different than the one or more first criteria;

initiating, for a third user, a third content item selection event that involves a third plurality of content delivery campaigns that includes the first content delivery campaign;

as part of the third content item selection event, selecting the first content delivery campaign;

after selecting the first content delivery campaign, determining that the third user satisfies the one or more second criteria;

in response to determining that the third user satisfies the one or more second criteria, associating the third user with the second performance data;

based on the second performance data, determining a third card configuration of the plurality of cards;

based on determining the third card configuration, causing the plurality of cards to be transmitted to a third computing device in the third card configuration.

20. The one or more storage media of claim 11, wherein the instructions, when executed by the one or more processors, further cause:

based on a set of events that pertain to the content item and the plurality of cards, determining a performance of each card in the plurality of cards;

based on a performance of a third card in the plurality of cards, determining to remove the third card from the plurality of cards;

after determining to remove the third card, as part of a third content item selection event, selecting the content item;

causing, to be transmitted to a third computing device, the content item that comprises the plurality of cards that does not include the third card.

\* \* \* \* \*